(12) United States Patent
Strock

(10) Patent No.: US 10,065,243 B2
(45) Date of Patent: Sep. 4, 2018

(54) ALUMINUM BASED ABRADABLE MATERIAL WITH REDUCED METAL TRANSFER TO BLADES

(71) Applicant: UNITED TECHNOLOGIES CORPORATION, Hartford, CT (US)

(72) Inventor: Christopher W. Strock, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 1608 days.

(21) Appl. No.: 13/632,657

(22) Filed: Oct. 1, 2012

(65) Prior Publication Data

US 2014/0093360 A1    Apr. 3, 2014

(51) Int. Cl.
*B22F 5/04* (2006.01)
*F01D 11/12* (2006.01)
*C22C 21/02* (2006.01)
*C22C 32/00* (2006.01)

(52) U.S. Cl.
CPC ............... *B22F 5/04* (2013.01); *C22C 21/02* (2013.01); *C22C 32/00* (2013.01); *F01D 11/122* (2013.01); *F05D 2300/121* (2013.01); *F05D 2300/6032* (2013.01); *Y02T 50/672* (2013.01)

(58) Field of Classification Search
CPC ....... F01D 11/001; F01D 11/12; F01D 11/122
See application file for complete search history.

(56) References Cited

U.S. PATENT DOCUMENTS

| | | | |
|---|---|---|---|
| 5,435,825 A * | 7/1995 | Kusui et al. | 75/232 |
| 5,976,695 A | 11/1999 | Hajmrle et al. | |
| 6,533,285 B2 | 3/2003 | Nava et al. | |
| 6,887,036 B2 | 5/2005 | Ohara et al. | |
| 6,887,530 B2 * | 5/2005 | Fiala et al. | 427/456 |
| 7,029,232 B2 | 4/2006 | Tuffs et al. | |
| 7,582,362 B2 | 9/2009 | Fiala et al. | |
| 7,736,760 B2 | 6/2010 | Nicoll et al. | |
| 7,998,604 B2 | 8/2011 | Reynolds et al. | |
| 2004/0219010 A1 | 11/2004 | Merrill | |
| 2009/0136740 A1 | 5/2009 | Reynolds | |
| 2010/0143103 A1 | 6/2010 | Sellars et al. | |
| 2010/0284797 A1 | 11/2010 | Jarrabet et al. | |
| 2011/0164963 A1 | 7/2011 | Taylor | |
| 2011/0243715 A1 | 10/2011 | Strock | |
| 2012/0063888 A1 | 3/2012 | Strock et al. | |
| 2012/0189434 A1 | 7/2012 | Strock et al. | |

FOREIGN PATENT DOCUMENTS

EP    1878876 A2    1/2008
GB    1 415 507    11/1975

OTHER PUBLICATIONS

European search report for Application No. 13844009.4-1373 dated May 31, 2016.
European Office action for Application No. 13844009.4-1373 dated Jul. 12, 2017.

* cited by examiner

Primary Examiner — Woody Lee, Jr.
Assistant Examiner — Adam W Brown
(74) Attorney, Agent, or Firm — Bachman & LaPointe, P.C.

(57) ABSTRACT

A turbomachine has a seal which mates to a plurality of airfoils. The seal is formed from an abradable aluminum based material having a plurality of hard phase particles embedded therein and having a melting point higher than a melting point of the melting point of the abradable coating matrix alloy.

20 Claims, 2 Drawing Sheets

ALUMINUM BASED ABRADABLE MATERIAL WITH REDUCED METAL TRANSFER TO BLADES

BACKGROUND

The present disclosure is directed to an aluminum based abradable material which includes hard phases to help wear any material transfer back off the tips of a rotating part, such as a compressor blade, and stationary parts such as cantilevered vanes.

Compressor efficiency is related to blade tip clearance, outer air seal roughness, and gas permeability. Coatings for the low compressor, against which compressors blades seal and rub, are typically aluminum based and applied to the casing surrounding the blades. Under certain conditions, the coatings transfer metal to the tips of the airfoils. This transfer is often localized on the airfoil tip, forming a bump on the airfoil tip and concurrently causes localized wear of the seal in what is known as a record groove pattern. The result is increased average tip clearance and increased roughness in the air flow direction.

SUMMARY

In accordance with the present disclosure, there is provided a turbomachine which broadly comprises a seal mating to a plurality of airfoils, known in the industry as an outer air seal; and the seal being formed from an abradable aluminum based material having a plurality of hard phase particles embedded therein and having a melting point higher than the melting point of the abradable coating matrix alloy.

In another and alternative embodiment, the abradable aluminum based material contains from 40 to 60 vol % aluminum.

In another and alternative embodiment, the abradable aluminum based material comprises an aluminum-silicon based alloy.

In another and alternative embodiment, the abradable aluminum based material is characterized by the absence of any solid lubricant in the aluminum based material.

In another and alternative embodiment, the airfoils have tips, and the hard phase particles in the abradable material facilitate the removal of any material transferred from the seal to the tips.

In another and alternative embodiment, the hard phase particles have an average diameter in the range of from 1.0 micron to 45 microns.

In another and alternative embodiment, the hard phase particles have an average diameter in the range of from 5.0 microns to 45 microns.

In another and alternative embodiment, the hard phase particles have an average diameter in the range of from 5.0 microns to 20 microns.

In another and alternative embodiment, the hard phase particles are present in an amount sufficient to raise an effective surface melting point of a matrix material of the abradable aluminum base material to a temperature higher than a melting point of the matrix material during a rub event.

In another and alternative embodiment, the hard phase particles are present in an amount of less than 10 vol % of the abradable aluminum based material.

In another and alternative embodiment, the hard phase particles are present in an amount in the range of from 0.1 to 5.0 vol %.

In another and alternative embodiment, the hard phase particles are present in an amount in the range of from 1.0 to 5.0 vol %.

In another and alternative embodiment, the seal is an inner air seal, which is positioned on a rotating surface of the inner flow path and mates to the tips of cantilevered vanes.

Further in accordance with the present disclosure, there is provided a seal material which broadly comprises an abradable aluminum based material containing from 40 to 60 vol % aluminum and having a plurality of hard phase particles embedded therein and the hard phase particles being present in an amount less than 10 vol % of the aluminum based material.

In another and alternative embodiment, the hard phase particles are present in an amount in the range of from 0.1 to 5.0 vol %.

In another and alternative embodiment, the hard phase particles are present in an amount in the range of from 1.0 to 5.0 vol %.

In another and alternative embodiment, the hard phase particles are present in an amount which is sufficient to remove transferred matrix material from airfoil tips.

In another and alternative embodiment, the hard phase particles have a particle size in the range of from 1.0 to 45 microns.

In another and alternative embodiment, the hard phase particles have a particle size in the range of from 5.0 to 45 microns.

In another and alternative embodiment, the hard phase particles have a particle size in the range of from 5.0 to 20 microns.

In another and alternative embodiment, the hard phase particles are selected from the group consisting of alumina, hard oxides, nitrides, carbides, intermetallics, and combinations thereof.

Other details of the aluminum based abradable material with reduced metal transfer to blades are set forth in the following detailed description and the accompanying drawings wherein like reference numerals depict like elements.

DETAILED DESCRIPTION OF THE DRAWINGS

Figure 1:
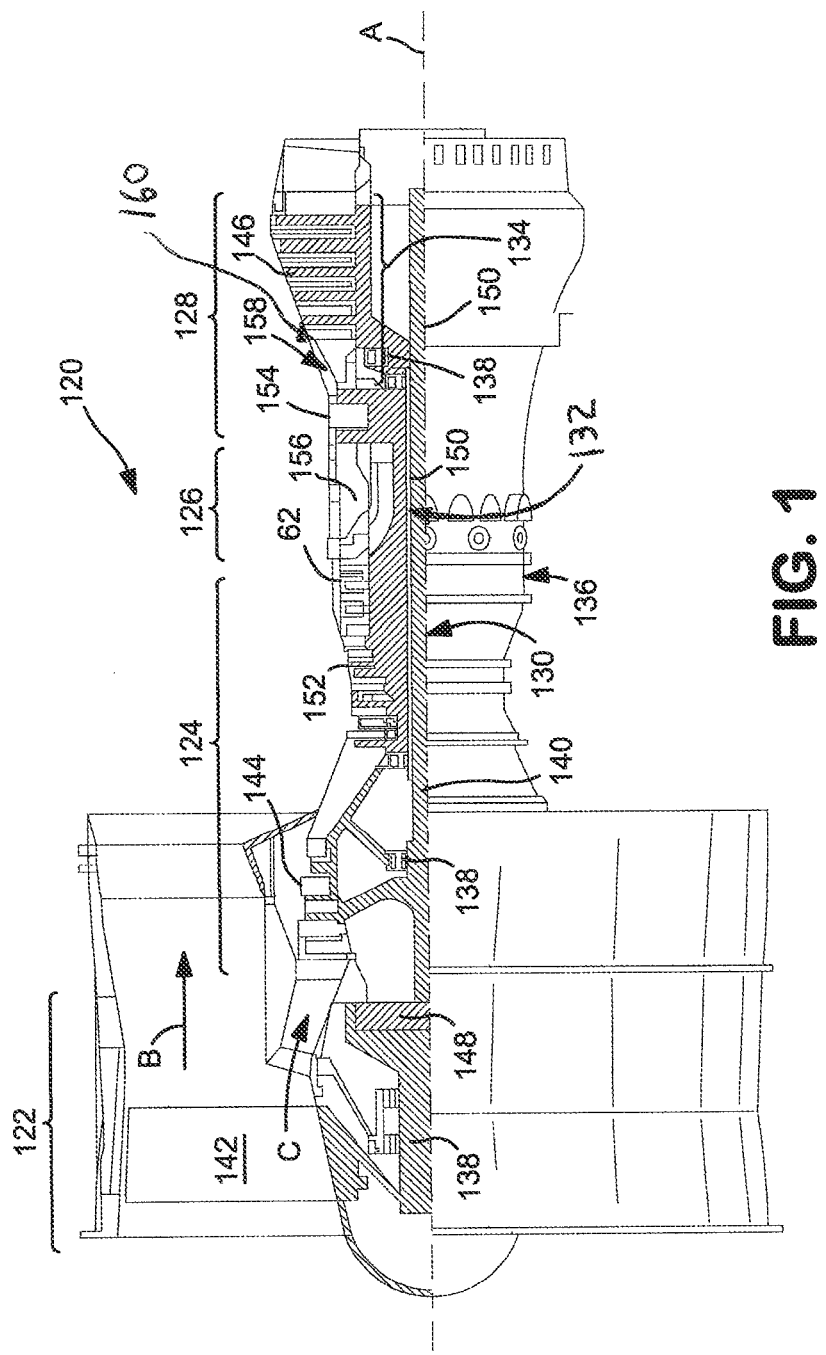
FIG. 1 is a sectional view of a gas turbine engine.

FIG. 1 schematically illustrates an example gas turbine engine 120 that includes a fan section 122, a compressor section 124, a combustor section 126 and a turbine section 128. Alternative engines might include an augmenter section (not shown) among other systems or features. The fan section 122 drives air along a bypass flow path B while the compressor section 124 draws air in along a core flow path C where air is compressed and communicated to a combustor section 126. In the combustor section 126, air is mixed with fuel and ignited to generate a high pressure exhaust gas stream that expands through the turbine section 128 where energy is extracted and utilized to drive the fan section 122 and the compressor section 124.

Although the disclosed non-limiting embodiment depicts a turbofan gas turbine engine, it should be understood that the concepts described herein are not limited to use with turbofans as the teachings may be applied to other types of turbomachinery; for example, turbine pumps and compressors used in gas liquification, on pipelines or a turbine engine including three spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided.

The low speed spool 130 generally includes an inner shaft 140 that connects a fan 142 and a low pressure (or first) compressor section 144 to a low pressure (or first) turbine section 146. The inner shaft 140 drives the fan 142 through a speed change device, such as a geared architecture 148, to drive the fan 142 at a lower speed than the low speed spool 130. The high speed spool 132 includes an outer shaft 150 that interconnects a high pressure (or second) compressor section 152 and a high pressure (or second) turbine section 154. The inner shaft 140 and the outer shaft 150 are concentric and rotate via the bearing systems 138 about the engine central longitudinal axis A.

A combustor 156 is arranged between the high pressure compressor 152 and the high pressure turbine 154. In one example, the high pressure turbine 154 includes at least two stages to provide a double stage high pressure turbine 154. in another example, the high pressure turbine 154 includes only a single stage. As used herein, a "high pressure" compressor or turbine experiences a higher pressure than a corresponding "low pressure" compressor or turbine.

The example low pressure turbine 146 has a pressure ratio that is greater than about 5. The pressure ratio of the example low pressure turbine 146 is measured prior to an inlet of the low pressure turbine 146 as related to the pressure measured at the outlet of the low pressure turbine 146 prior to an exhaust nozzle.

A mid-turbine frame 158 of the engine static structure 136 is arranged generally between the high pressure turbine 154 and the low pressure turbine 146. The mid-frame turbine 158 further supports bearing systems 138 in the turbine section 128 as well as setting airflow entering the low pressure turbine 146.

The core airflow C is compressed by the low pressure compressor 144 then by the high pressure compressor 152 mixed with fuel and ignited in the combustor 156 to produce high speed exhaust gases that are then expanded through the high pressure turbine 154 and low pressure turbine 146. The mid-turbine frame 158 includes vanes 160, which are in the core airflow path and function as an inlet guide vane for the low pressure turbine 146. Utilizing the vane 160 of the mid-turbine frame 158 as the inlet guide vane for low pressure turbine 146 decreases the length of the low pressure turbine 146 without increasing the axial length of the mid-turbine frame 158. Reducing or eliminating the number of vanes in the low pressure turbine 146 shortens the axial length of the turbine section 128. Thus, the compactness of the gas turbine engine 120 is increased and a higher power density may be achieved.

The disclosed gas turbine engine 120 in one example is a high-bypass geared aircraft engine. In a further example, the gas turbine engine 120 includes a bypass ratio greater than about six, with an example embodiment being greater than about ten. The example geared architecture 148 is an epicyclical gear train, such as a planetary gear system, star gear system or other known gear system, with a gear reduction ratio of greater than about 2.3.

In one disclosed embodiment, the gas turbine engine 120 includes a bypass ratio greater than about 10:1 and the fan diameter is significantly larger than an outer diameter of the low pressure compressor 144. It should be understood however that the above parameters are only exemplary of one embodiment of a gas turbine engine including a geared architecture and that the present disclosure is applicable to other gas turbine engines.

The example gas turbine engine includes the fan 142 that comprises in one non-limiting embodiment less than about twenty-six fan blades. In another non-limiting embodiment, the fan section 122 includes less than about twenty fan blades. Moreover, in one disclosed embodiment, the low pressure turbine 146 includes no more than about six turbine rotors schematically illustrated at 134. In another non-limiting example embodiment, the low pressure turbine 146 includes about three turbine rotors. A ratio between the number of fan blades 142 and the number of low pressure turbine rotors is between about 3.3 and about 8.6. The example low pressure turbine 146 provides the driving power to rotate the fan section 122 and therefore the relationship between the number of turbine rotors 134 in the low pressure turbine 146 and the number of blades 142 in the fan section 122 discloses an example gas turbine engine 120 with increased power transfer efficiency.

Figure 2:
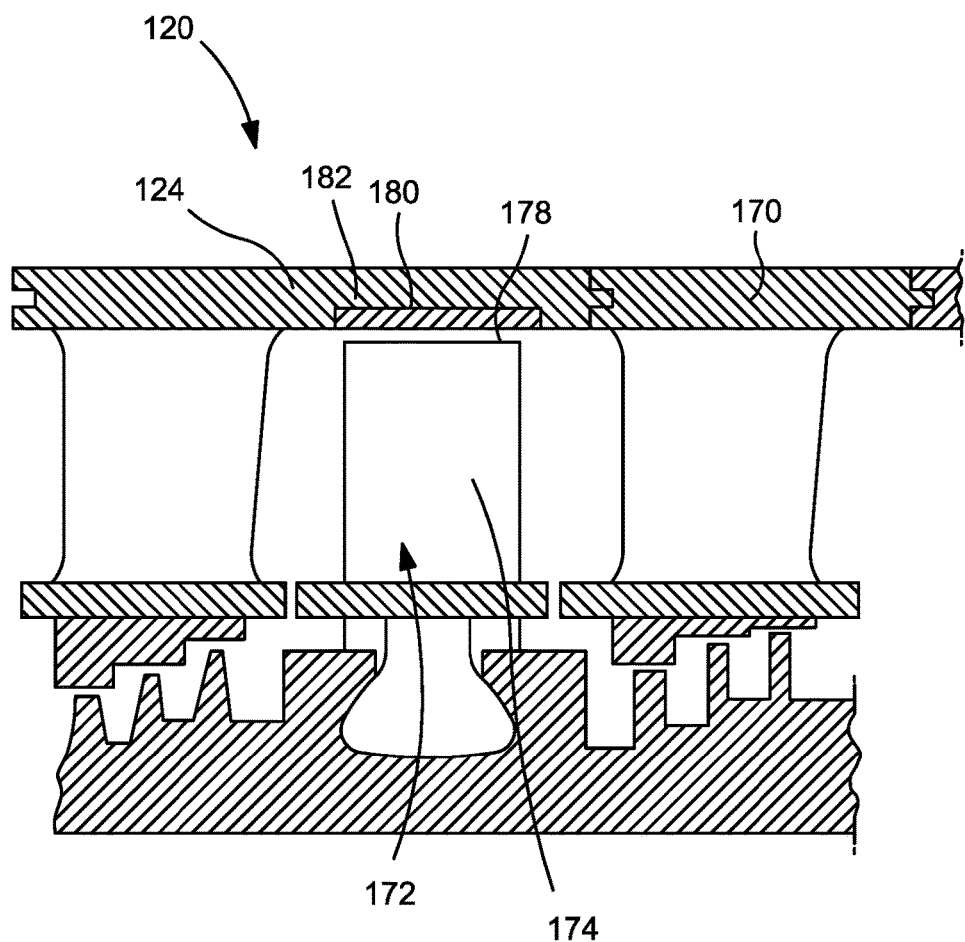
FIG. 2 is a schematic representation of a portion of the compressor section of the gas turbine engine.

Referring now to FIG. 2, there is shown a portion of the compressor section 124 of the gas turbine engine 120. The compressor section 124 has a casing 170 which surrounds one or more rows of compressor blades 172, each having an airfoil 174. The blades 172 rotate about the longitudinal axis A of the engine 120. In order to improve compressor efficiency, an outer air seal 180 is attached to an interior surface 182 of the casing 170. The blades 172 may be formed from a titanium based alloy, a nickel based alloy, an iron based alloy, a composite material, a ceramic material, or intermetallics included in titanium and nickel alloys.

The outer air seal 180 is formed from an abradable aluminum-based material which contains from 40 to 60 vol % of aluminum, less than 10 vol % hard phase particles, and the remainder being air space (porosity), and fillers such as a polymer filler or a low density hexagonal boron nitride filler. One suitable alloy for use as the abradable aluminum-based material is an Al—Si alloy. The abradable aluminum-based material forming the outer air seal 180 may be further characterized by the absence of any solid lubricant in the material. Although, if desired, a solid lubricant may be present in the abradable aluminum-based material. The abradable aluminum based material has a melting point which is lower than a melting point of the material forming the airfoils 174.

In use, there may be a local buildup of the aluminum air seal material on the tips 178 of the airfoils 174. In accordance with the present disclosure, there is provided the additional hard phase particles in the abradable aluminum-based material forming the outer air seal 180. The additional hard phase particles in the abradable material forming the air seal 180 help wear any material transfer back off the airfoil tips 178.

The hard phase particles included in the abradable aluminum-based material forming the outer air seal 180 may include hard phases formed from alumina or other hard materials such as oxides, nitrides, carbides, intermetallics, and combinations thereof dispersed throughout the coating.

These hard particles must have both a hardness and a melting point higher than the metallic matrix of the abradable aluminum based matrix material. In an example with an aluminum alloy matrix with 12 wt % silicon, these hard particles may be metal oxides, mixtures and alloys thereof, including, but not limited to, alumina, silica, zirconia, chromia, titania, magnesia, and hafnia. Other suitable non-oxide hard particles include boron carbide, cubic boron nitride, titanium nitride, titanium carbide, silicon carbide, silicon nitride, diamond, tungsten, tungsten carbide, chromium carbide, and titanium aluminide, among many others.

The hard phase particles may be included in the abradable aluminum-based material through incorporation in the feed stock powder as individual particles, composite particles, or as precipitates in the abradable aluminum-based material. Alternatively, oxide particles may be produced during an air spray process such as air plasma spray, combustion flame spray, or wire arc spray, or alternatively by in situ formation within the coating. In situ formation may include by chemical conversion processes such as anodizing. In situ formed oxides or conversion phases would be characterized by similar thicknesses to the diameters discussed as particles.

The hard phase particles should have particle sizes and fractions sufficient to be aggressive to remove transferred material from the airfoil tips 178 while not excessively wearing or damaging the airfoil tips 178. The particles forming the hard phase may have an average diameter in the range of from 1.0 micron to 45 microns. In one useful embodiment, the particle size may be in the range of from 5.0 microns to 45 microns. In another useful embodiment, the particle size may be in the range of from 5.0 microns to 20 microns.

The hard phase particles should be present in an amount sufficient to raise the effective melting point of the matrix material of the abradable aluminum base material to a temperature higher than a melting point of the matrix material during a rub event so as to facilitate the removal of any aluminum material transferred to the airfoil tips 178. By using hard particles of a sufficient size, the rub response may be dominated by preferential contact with the higher melting point hard particles, rather than the matrix material. As used herein, the term "matrix" refers to the material that is holding the coating together. In the case of an aluminum alloy, such as aluminum-silicon, the matrix is the aluminum alloy.

The hard phase particles may be present in an amount of less than 10 vol % of the abradable aluminum based material forming the outer air seal 180. In one embodiment, the hard phase particles may be present in an amount from 0.1 to 5.0 vol % of the aluminum based material forming the outer air seal 180. In another embodiment, the hard phase particles may be present in an amount from 1.0 to 5.0 vol % of the aluminum based material forming the outer air seal 180.

One of the benefits of the addition of the hard phase particles is that there is less metal transfer to the blade tips 178 which results in a smoother abradable surface after rub and tighter tip clearances which in turn allows more efficient engine operation.

While the abradable aluminum based material with the embedded hard particles has been described in the context of being used as an outer air seal, it should be recognized that the abradable aluminum based material can be used in other environments. For example, the abradable aluminum based material could be used as an inner seal which is positioned on a rotating surface of the inner flow path and mates to the tips of cantilevered vanes.

There has been provided in accordance with the present disclosure an aluminum based abradable material with reduced metal transfer to blades. While the present disclosure has been made in the context of specific embodiments thereof, other unforeseen alternatives, modifications and variations may become apparent to those skilled in the art having read the foregoing disclosure. Accordingly, it is intended to embrace those alternatives, modifications, and variations as fall within the broad scope of the appended claims.

What is claimed is:

1. A turbo-machine comprising:
a seal mating to a plurality of airfoils; and
said seal being formed from an abradable aluminum based material having a plurality of hard phase particles embedded therein and having a melting point higher than the melting point of the abradable coating matrix alloy, wherein said abradable aluminum based material is characterized by the absence of any solid lubricant in the aluminum based material.

2. The turbo-machine of claim 1, wherein said abradable aluminum based material contains from 40 to 60 vol % aluminum.

3. The turbo-machine of claim 1, wherein said abradable aluminum based material comprises an aluminum-silicon based alloy.

4. The turbo-machine of claim 1, wherein said airfoils have tips, and said hard phase particles in the abradable material facilitate the removal of any material transferred from the seal to the tips.

5. The turbo-machine of claim 1, wherein the hard phase particles have an average diameter in the range of from 1.0 micron to 45 microns.

6. The turbo-machine of claim 1, wherein the hard phase particles have an average diameter in the range of from 5.0 microns to 45 microns.

7. The turbo-machine of claim 1, wherein the hard phase particles have an average diameter in the range of from 5.0 microns to 20 microns.

8. The turbo-machine of claim 1, wherein the hard phase particles are present in an amount sufficient to raise an effective surface melting point of a matrix material of the abradable aluminum base material to a temperature higher than a melting point of the matrix material during a rub event.

9. The turbo-machine of claim 1, wherein the hard phase particles are present in an amount of less than 10 vol % of the abradable aluminum based material.

10. The turbo-machine of claim 1, wherein the hard phase particles are present in an amount in the range of from 0.1 to 5.0 vol %.

11. The turbo-machine of claim 1, wherein the hard phase particles are present in an amount in the range of from 1.0 to 5.0 vol %.

12. The turbo-machine of claim 1, wherein the seal is an outer air seal.

13. A seal material comprising an abradable aluminum based material containing from 40 to 60 vol % aluminum and having a plurality of hard phase particles embedded therein and said hard phase particles being present in an amount less than 10 vol % of the aluminum based material.

14. The seal material of claim 13, wherein said hard phase particles are present in an amount in the range of from 0.1 to 5.0 vol %.

15. The seal material of claim 13, wherein said hard phase particles are present in an amount in the range of from 1.0 to 5.0 vol %.

16. The seal material of claim 13, wherein said hard phase particles are present in an amount which is sufficient to remove transferred matrix material from airfoil tips.

17. The seal material of claim 13, wherein the hard phase particles have a particle size in the range of from 1.0 to 45 microns.

18. The seal material of claim 13, wherein said hard phase particles have a particle size in the range of from 5.0 to 45 microns.

19. The seal material of claim 13, wherein said hard phase particles have a particle size in the range of from 5.0 to 20 microns.

20. The seal material of claim 13, wherein said hard phase particles are selected from the group consisting of alumina, hard oxides, nitrides, carbides, intermetallics, and combinations thereof.

* * * * *